J. W. HATCH.
Apparatus for Crimping the Stiffenings of Boots and Shoes.
No. 6,319. Reissued March 9, 1875.
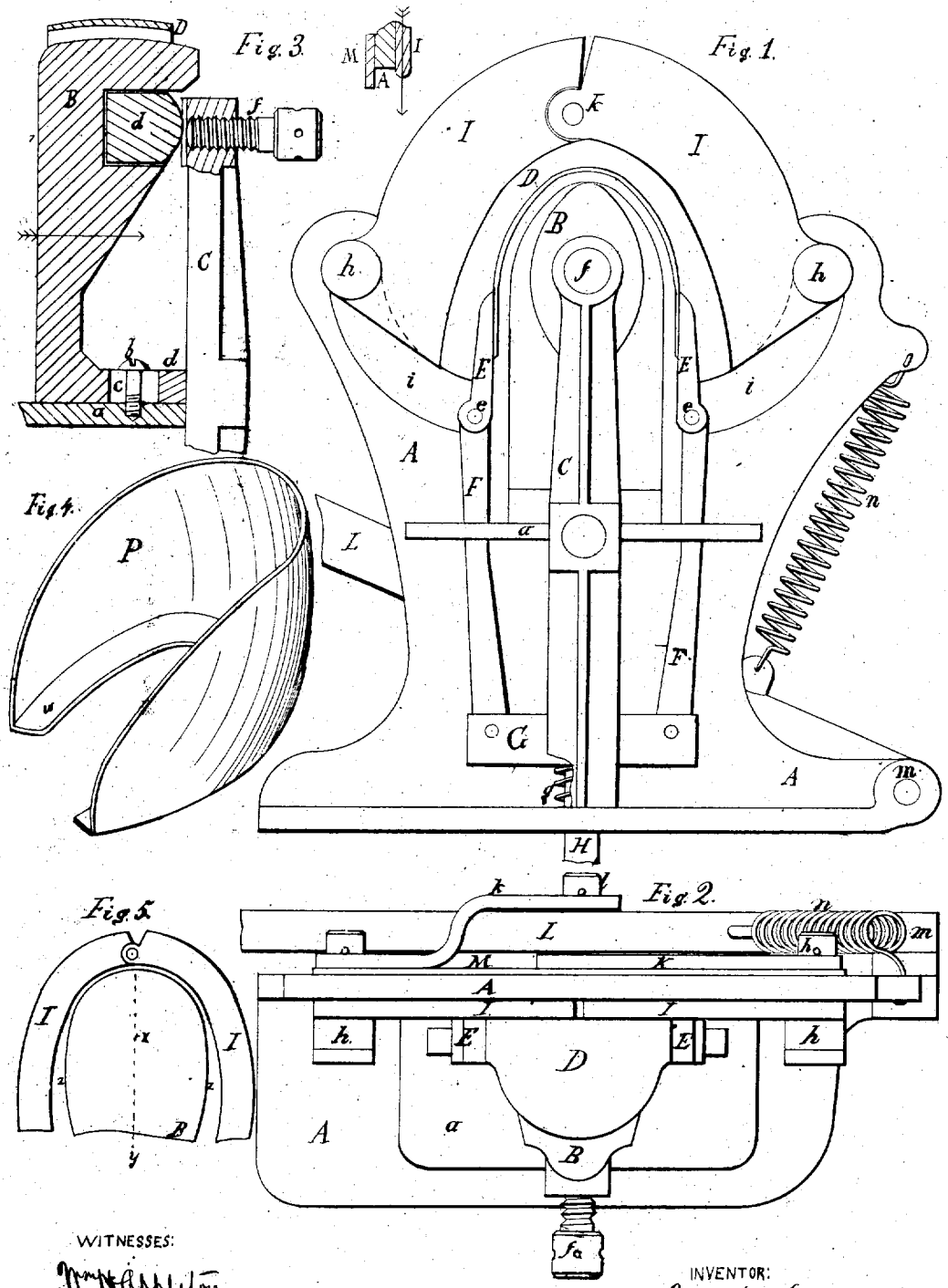
WITNESSES:
INVENTOR:
Jesse W. Hatch
per Crosby Gregory
Attys.

BEST AVAILABLE COPY

UNITED STATES PATENT OFFICE.

JESSE W. HATCH, OF ROCHESTER, NEW YORK.

IMPROVEMENT IN APPARATUS FOR CRIMPING THE STIFFENINGS OF BOOTS AND SHOES.

Specification forming part of Letters Patent No. 117,627, dated August 1, 1871; Reissue No. 6,319, dated March 9, 1875; application filed February 23, 1875.

*To all whom it may concern:*

Be it known that I, JESSE W. HATCH, of Rochester, Monroe county, and State of New York, have invented certain Improvements in Machine for Crimping Heel-Stiffeners for Boots and Shoes, of which the following is a specification.

This invention relates to a machine for crimping leather or leather-board heel-stiffeners for boots or shoes; and consists in the combination of a heel-form with crimping mechanism, the heel-form and crimping mechanism being adapted to yield, the one from the other, to conform to different thicknesses of material or to inequalities in the stock; also, in the combination, with a heel-form, of crimping-jaws, the combination operating to bend or wipe over toward the central portion of, and closely against the edge of the form, the end and sides of the stiffener as hereinafter described; also, in the combination, with crimping-jaws and heel-form, of a stiffening-holder, and also of a gage, and also in a process of forming or bending over the flanged portion of the stiffening, consisting of first impinging the stiffening between the crimping or turning mechanism at the edge of the heel-form, and then turning the edge and back of the stiffening from the outside of the stiffening toward the center of the heel-form or toward a line drawn centrally through such form, whereby the flange is crimped, and the stiffening, without being notched, is fitted closely to the heel-form.

In the drawing, Figure 1 is a front elevation of the machine; Fig. 2, a plan; Fig. 3, vertical cross-section of the heel-form and contiguous parts; Fig. 4, a view of the stiffening, and Fig. 5 a rear view of the heel-form.

A represents the frame, which may be bolted to a bench or table in any desired manner. B is the heel-form, on which the stiffener is placed to be crimped. It is secured to a ledge or leaf, *a*, of the frame by means of a screw, *b*, which passes through a slot, *c*, thus allowing the form to yield toward the standard C as the crimping-jaws close behind it. Blocks of rubber *d d*, or equivalent springs, are interposed between the form and the standard to allow the form to yield. A set-screw, *f*, presses against the rubber set in a socket of the form, by which means an adjustment of that portion of the form upon which the leather rests may be attained. This arrangement of the form, by which the necessary elasticity is produced, forms one feature of my invention. D is the holder for pressing the stiffener against the heel-form. It consists simply of a strap of thin metal, of sufficient width at the top to hold the stiffener, which is interposed between it and the form. E E and F F are toggle-arms, joined at *e*. The holder is attached to the upper ends of E E, while a cross-bar, G, connects the lower ends of F F, as shown; and to this cross-bar is attached a rod, H, which extends downward, and connects in any suitable manner with a treadle. (Not shown in the drawing.)

When the foot is applied to the treadle it will be seen that the holder will be drawn down firmly upon the stiffener, which is interposed between it and the heel-form, thus holding it firmly in place while the crimping action is being performed.

The reaction of the holder is produced by means of a coiled spring, *g*, around the treadle-rod beneath the cross-bar. Any equivalent means may be employed. This arrangement of the holder and the toggle-arms for operating it constitutes another feature of my invention when combined with the heel-form, as above described.

The crimping mechanism consists of jaws or crimpers I I, each pivoted at one end to pivot-pins *h h*, which move up and down in curved slots *i i* of the frame. At the other end they are jointed together, as shown at K, thus forming an arch, which rests just back of the heel-form, and in position to strike close to the rear of the latter when brought down, as shown in Fig. 3. The lower edges of the jaws are rounded, so as not to cut the leather. Connecting rods or bars K K, Fig. 2, connect the pivots *h h* of the jaws with the pivot *l* of the lever L, having its fulcrum at *m*, and moved in one direction by a coiled spring, *n*, or any equivalent means.

A slot is made in the frame for the pin *l* to work in, and a slot is also made in the end of the lever to work over fulcrum *m*. As the lever is depressed it will be seen that the crimping-jaws will be drawn down bodily, and at the same time contracted in their arch, so as to embrace the edges of the leather which rests over the rear part of the heel-form, thus crimping them into the form they occupy in the heel of the boot or shoe. This is caused by the following down of the pivots *h h* in the slots *i i*. As the jaws strike the leather the form yields against the springs, as before described, and thus prevents the cutting of the leather, at the same time presenting sufficient resistance to insure the proper crimping action. This arrangement of the crimping-jaws, whereby they press bodily upon the leather and at the same time contract upon the circle, forms another feature of my invention, as combined with the heel-form, when the two are adapted to yield one from the other. The pivots *h h* come opposite the toggle-arms E F, so that, when pressed down, they rest in contact therewith, and assist to hold the holder upon the stiffener. In the rear of the crimping-jaws is situated a gage-plate, M, which is also arched and projects sufficiently low to act as a stop to the stiffener as it is thrust in place between the holder and form. This may be either jointed upon the pins *h h*, so as to open and close with the jaws, as shown in the drawing, or it may be made stationary with the frame. This also constitutes a feature of my improvement.

This apparatus is not only very rapid and effective in execution, but also produces better work than can be produced by hand. It turns the edges down perfectly, and obviates notching or slitting of the stiffener, which is sometimes done, and which impairs the rigidity and ability of the stiffener to retain its form. The stiffening P may be made either of leather or leather-board, which is the pulp of leather pressed with fiber into sheets.

The operation of my mechanism is as follows: The stiffener is placed against the heel-form, its lower or straight edge is supported or held by the gate-plate M, and the holder then descends and clamps the stiffener to the heel-form. In this condition the crimping-jaws or devices act upon the edge of the stiffener, projecting beyond the heel-form, and turn such edges over the heel-form. The jaws or crimper first act on the stiffener at the end of the heel-form and then gradually close in upon the stiffener and heel-form, and bend over the projecting edge toward the center *x* of the heel or toward a line, *y*, drawn centrally through the heel-form, as shown in Fig. 5. By bending or turning the edge of the stiffener in this way, by a crimper which forces the edge toward the center *x* of the heel, or toward a central line through such heel-form, the said edge is wiped or forced snugly and closely over and about the heel-form, and over its outer edge Z, forming a well-defined smooth crease, enabling the stiffening to assume just the shape of the heel-form being used, and the stiffener retains such form, and the gathers or crimps in the flanged portion or edge *w*, turned over on the face of the heel-form, are wiped or forced to the extreme inner edge or corner of the flange, leaving the junction between the vertical portion of the stiffening and the flange smooth and free from wrinkles, which is a matter of great importance.

My new process consists in turning the edge of the stiffener, forming the end and sides over a heel-form or support for the stiffener, and by a crimper acting to wipe the edge, end, and sides from the outside, and closely over or about the edge of the heel-form and toward its center, or a line drawn centrally through such heel-form. This action insures the formation of a smooth, well-defined turn, corresponding with the shape of the form being used for the crimping mechanism, owing to its wiping the stiffener closely over the edge of the heel-form, throws the gathers to the inner portion of the flange, and the stiffening at that portion of it, between the upright part and the flange, is smooth and perfectly conformed to the last, and has given to it what I denominate a set, which cannot be attained, in my opinion, by the use of crimping devices used prior to my invention. By means of a U-shaped rigid slide working longitudinally over the bottom of the heel-form and against a projecting edge of a stiffener a defined and proper crimp or turn cannot be given to the stiffener-flange, because the slide, after acting to turn the edge at the back of the stiffener, acts throughout the rest of its motion to break down the edge, and the edge is not wiped closely to or about the edge of the heel-form, but, on the contrary, the action is such as to push the edges of the stiffener, so that the contact between the stiffener and heel-form is not close or intimate. With my crimping mechanism, acting as described, the crimps in the heel seat or flange radiate toward the center of the heel, and are wiped toward the center of the heel, leaving the turn of the stiffener smooth, and the crimps may extend around the flange, instead of only at the center of the stiffener or at the back, as is the case with a rigid U-shaped slide. The crimps, to properly fashion and conform a stiffener to a heel-form, must extend around the flange wherever the heel-form is curved.

It is very necessary that the heel-form and crimping apparatus be arranged or combined with relation to each other so as to yield to adapt the parts to stiffeners of different thickness, or to inequalities in the stock; and to provide for this the heel-form is herein shown as provided with springs to allow it to yield. The stiffener-holder is a yielding one, and adapts itself to the thickness of the material between it and the heel-form.

Having described my invention, I claim—

1. In a machine for crimping heel-stiffenings, the combination of a heel-form with a crimping mechanism, the parts being adapted to yield with relation to each other, substantially as described.

2. The combination, with the heel-form, of the stiffening-holder and crimping-jaws, adapted to operate substantially as described.

3. In a machine for crimping heel-stiffeners, a heel-form, a holder, and crimping apparatus, substantially as described, adapted to move with relation to each other, to turn the entire edge of the stiffener from the outside toward the center of the heel-form, substantially as described.

4. The combination, with the heel-form, of the crimping-jaws and gage for the turned edge of the stiffening, substantially as described.

5. In the process of forming heel-stiffeners, first impinging the stiffener against the heel-form at the edge where the stiffener is to be bent, then forcing or wiping the edge of the stiffener from end to end, from its outer side over the edge, and converging toward the center of the heel-form, whereby the flange is turned and crimped, substantially as described.

6. The combination, with a heel-form, of a yielding holder to hold the stiffener to the heel-form and adapt itself to the thickness of the stiffening, substantially as described.

In witness whereof I have hereunto signed my name in presence of two subscribing witnesses.

J. W. HATCH.

Witnesses:
EDWIN R. BANTA,
CHAS. B. HATCH.